United States Patent [19]

Tokunaga et al.

[11] Patent Number: 4,617,460

[45] Date of Patent: Oct. 14, 1986

[54] OPTICAL FIBER SENSOR HAVING SHAPED ENDS

[75] Inventors: Ichiro Tokunaga; Hiroshi Matsunaga; Yoji Shimojima, all of Furukawa, Japan

[73] Assignee: Alps Electric Co., Ltd., Japan

[21] Appl. No.: 599,944

[22] Filed: Apr. 13, 1984

[30] Foreign Application Priority Data

Apr. 13, 1983 [JP] Japan ................................ 58-63746

[51] Int. Cl.$^4$ .............................................. H01J 5/10
[52] U.S. Cl. ................................ 250/227; 250/237 G
[58] Field of Search ............ 250/227, 231 SE, 237 G; 350/96.15, 96.19, 96.29

[56] References Cited

U.S. PATENT DOCUMENTS 4,096,383 6/1978 Mancini et al. ............... 250/231 SE
4,547,668 10/1985 Tsikos ............................ 250/227 X Primary Examiner—Eugene R. LaRoche
Assistant Examiner—James C. Lee
Attorney, Agent, or Firm—Guy W. Shoup

[57] ABSTRACT

In an optical fiber sensor comprising an optical fiber coupled with a light emission element and another optical fiber coupled with a light receiving element, end portions of the optical fibers other than those coupled with the aforementioned elements being arranged side by side and joined together in a closely contacting relation with the end surfaces of the optical fibers placed in opposition to a slit member to be detected such that the arranged direction of the optical fibers is aligned with a shifting direction of the slit member; the end portions of the optical fibers are formed into a flat configuration and joined together such that the flat side surfaces of the two fibers are brought into a surface contacting relation.

4 Claims, 8 Drawing Figures

OPTICAL FIBER SENSOR HAVING SHAPED ENDS

BACKGROUND OF THE INVENTION

This invention relates to an optical fiber sensor to be used in an optical rotary encoder, optical limit switch and the like.

Heretofore an optical fiber sensor to be used in a rotary encoder and the like has been constructed as shown in FIG. 1 including two optical fibers 1 and 2 of 1 mm diameter. The end portions of the optical fibers 1 and 2 are joined together such that peripheral surfaces thereof are in line contact with each other, and held at a position where the end surfaces of the optical fibers are spaced apart from a slit 3 by a predetermined distance Z, and arranged in side by side along the moving direction A of the slit 3. A luminous element (not shown) such as LED is coupled with the optical fiber 1, while a light receiving element (not shown) such as a phototransistor is coupled with the optical fiber 2.

With the above described arrangement of the conventional optical fiber sensor, the light emitted from the luminous element is transmitted through the optical fiber 1 in a direction B to irradiate reflecting surfaces 3a and nonreflecting surfaces 3e of the slit 3. One part of light reflected from the reflecting surfaces 3a enters the optical fiber 2 to be transmitted in a direction C toward the light receiving element. Since the slit 3 is constantly shifted in direction A, the light receiving element detects a high level $H_o$ and a low level $L_o$ of light quantity alternately in accordance with the variation of relative positions of the surfaces 3a and 3b to the end portion of the optical fiber sensor.

Ordinarily the high level $H_o$ and the low level $L_o$ of light quantity varies according to the distance Z between the end portion of the optical fiber sensor and the slit 3. FIG. 3 depicts the relation between the output of the light receiving element and the distance Z in case of utilizing optical fibers of 0.75 mm diameter and an encoder in the form of a circular disc for the slit 3. When the difference between the high level $H_o$ and low level $L_o$ is large, the stability of the output of the sensor is improved and the detection of a smaller width in the slit is made possible.

As is apparent in FIG. 3, in the conventional optical fiber sensor, the increasing rate of the high level $H_o$ according to an increase in the distance Z is less than the increasing rate of the low level $L_o$ under the same condition. In the conventional construction utilizing optical fibers of a circular cross section, the maximum light emitting angle and the maximum light receiving angle of the fibers are selected to be approximately 30°. As a consequence, an effective area from where light is reflected effectively coincides with an overlapping area $P_o$ (slashed in FIG. 2) between an irradiating region $X_o$ from the fiber 1 and a light receiving region $Y_o$ of the fiber 2. Thus the high level $H_o$ in FIG. 3 does not increase sufficiently according to the increase in the distance Z because the effective reflecting area is comparatively small and only a small part of the reflecting surfaces 3a is overlapped by the light receiving region $Y_o$. On the other hand, the light quantity of low level $L_o$ at the time of detecting low level light increases rapidly in accordance with the increase of the distance Z because an increase in the distance Z increases the width of the overlapping portion $P_o$ such that one part of the reflecting surfaces 3a located on both sides of the nonreflecting surfaces 3e are brought into the right and left ends of the overlapping portion $P_o$ as viewed in FIG. 2, and the light reflected from the part is also received in the optical fiber 2.

In case where a slit to be detected having a small width is read out by use of two optical fibers as described above, it is essential from the view point of subsequent electric processes that a large difference exists between the high level and low level of light quantities. Accordingly, the conventional optical fiber sensor which exhibits an insufficient light difference regardless of an increased distance Z could not provide a sufficient resolution.

SUMMARY OF THE INVENTION

An object of the present invention is to provide an optical fiber sensor which can provide a sufficient difference between the high and low light levels so that a stable output can be delivered out of the sensor.

Another object of the invention is to provide an optical fiber sensor which is stable and of high precision regardless of its simple construction.

These and other objects of the invention can be achieved by an optical fiber sensor wherein the end portions of an optical fiber coupled with a light source and another optical fiber coupled with a light receiving element are flattened by use of, for instance, a hot press. The side surfaces of the optical fibers thus flattened are then joined together in a face-contacting relation, while the end surfaces of the two optical fibers thus arranged side by side are placed in a spaced apart relation from a slit to be detected which is shifted in a direction parallel to the arranged direction of the end surfaces.

With the above described construction of the optical fiber sensor, the effective area from which light is reflected effectively extends on both sides of the joined portion between the two optical fibers so that the area thereof is increased from that of the conventional construction wherein the two optical fibers are joined together in a line-contact manner. Furthermore, the effective area is extended in the elongated direction of the reflection surfaces of the slit, and therefore a sufficient difference in light quantity can be obtained between the high level and low level.

DESCRIPTION OF THE PREFERRED EMBODIMENTS

Figure 1:
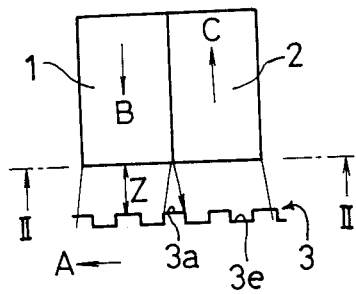
FIG. 1 is a front view showing an end portion of a conventional optical fiber sensor.
Figure 2:
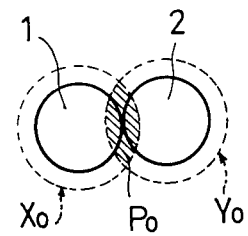
FIG. 2 is a sectional view taken along the line II—II in FIG. 1.

A preferred embodiment of the present invention will now be described in detail with reference to FIGS. 4 through 8.

An end portion 4 of optical fiber coupled with a luminous element such as LED (not shown) as well as another end portion 5 of optical fiber coupled with a light receiving element such as phototransistor (not shown) are formed into a flat shape having a thickness t by means of a hot press and the like. Herein the thickness t is selected to a suitable value in consideration of a pitch S in a slit member 3 and a distance Z between the end portions 4 and 5 and the slit 3. The end portions 4 and 5 of the optical fibers are then joined into a bundle with the flattened side surfaces of the optical fibers brought into a face-contacting relation. As a consequence, the effective area from which reflected light is effectively received is brought into a position as designated by P in FIG. 5. The end portions 4 and 5 thus joined together into a bundle are placed at a position spaced apart by a distance Z from a slit 3 to be detected that is shifted in a direction A parallel to the direction in which the two end portions 4 and 5 of the optical fibers are arranged side by side. The effective area P is thus extended in the elongating direction of the reflecting surfaces 3a of the slit member 3. In the drawing, 3b designates non-reflecting surfaces of the slit member 3, and $\theta$ designates a maximum light emitting and receiving angle of the optical fibers.

Figure 4:
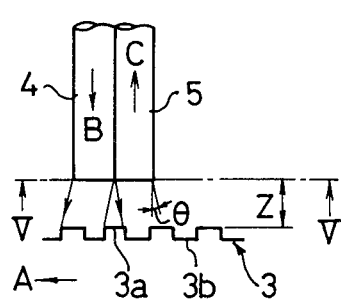
FIG. 4 is a front view showing an end portion of an optical fiber sensor according to the present invention.
Figure 5:
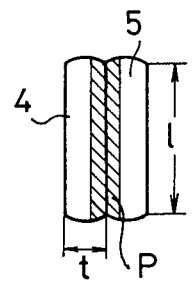
FIG. 5 is a sectional view taken along the line V—V in FIG. 4.

The operation of the embodiment will now be described. FIG. 4 shows a positional relation between the end portions 4 and 5 and the slit member 3 in case where the sensor detects a high level. In this case one of the reflecting surfaces 3a is brought into a position overlapping the effective area P so that a part of light transmitted through the end portion 4 in a direction B to be emitted therefrom is reflected by the reflecting surface 3a in the end portion 5. The light is then transmitted through the end portion 5 in a direction C. The phototransistor (not shown) detects the light and delivers an output corresponding to a light quantity of high level.

Figure 6:
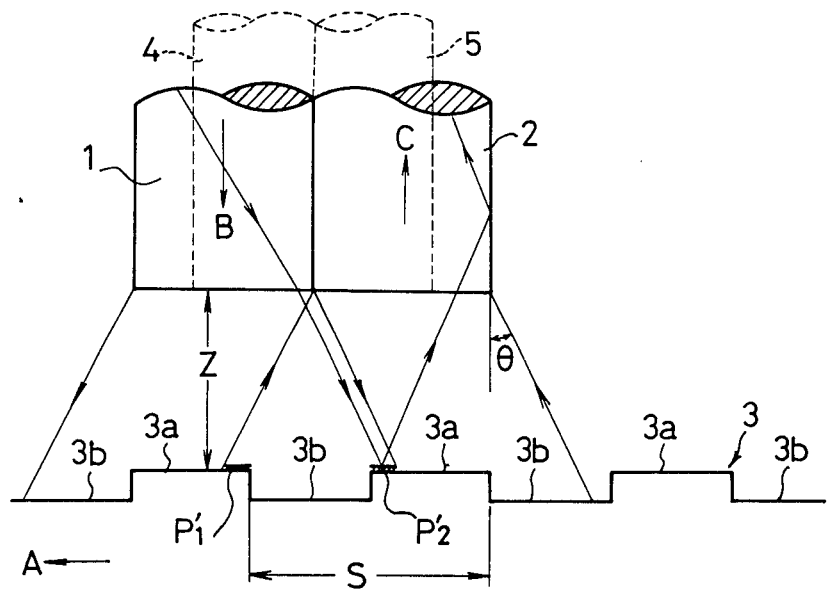
FIG. 6 is a diagram showing an important part of the invention where the sensor detects a low level of reflected light.

FIG. 6 shows a positional relation between the end portions 4 and 5 and the slit member 3 in case the sensor detects a low level. In this case, one of non-reflecting surfaces 3b is overlapped with the effective area P, and therefore no output should be delivered from the phototransistor. However, the leftward and rightward edges of the effective area P tend to be overlapped with the reflecting surfaces 3a provided on both sides of the nonreflecting surface 3b as shown by $P_1'$ and $P_2'$ in FIG. 6. If the end portions of the optical fibers are of a circular configuration as shown by 1 and 2 in FIG. 6, the light reflected from the overlapped portion $P_2'$ at the rightward edge of the effective area P would be received in the end portion 1 of the optical fiber. However, since the end portions 4 and 5 of the optical fibers of the present invention have been flattened as shown by dotted lines in FIG. 6, the reflected light is not received in the end portion 5. Thus when the distance Z increases to increase the overlapped portions $P_1'$ and $P_2'$ of the reflecting surfaces, the light quantity received by the phototransistor can be minimized. As a consequence, the difference between high level and low level detected by the optical sensor can be maintained at large values, and the sensitivity in detecting the slit can be substantially improved.

Figure 3:
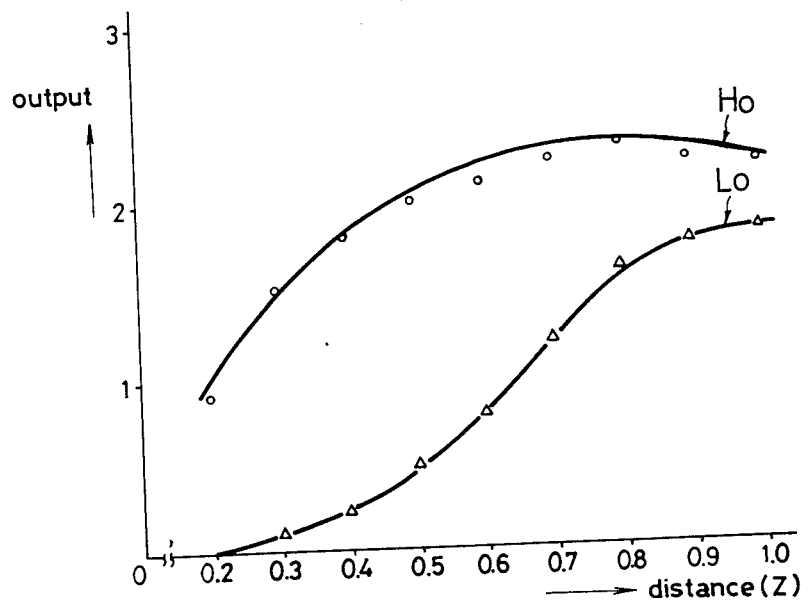
FIG. 3 represents characteristic curves of high and low level outputs obtained from the conventional sensor.
Figure 7:
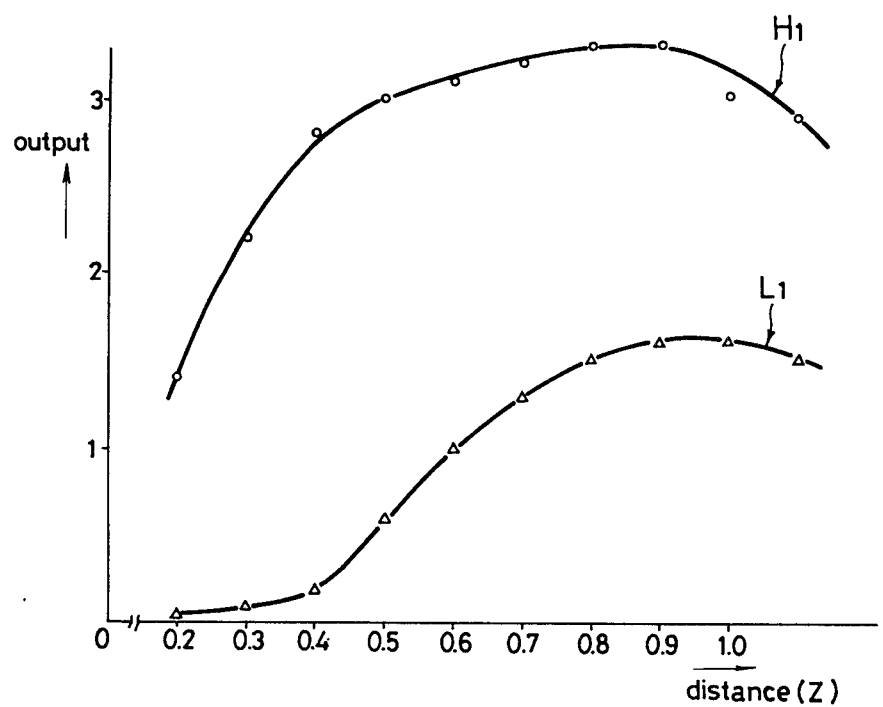
FIG. 7 represents characteristic curves of high and low level outputs obtained from the optical fiber sensor according to the present invention.
Figure 8:
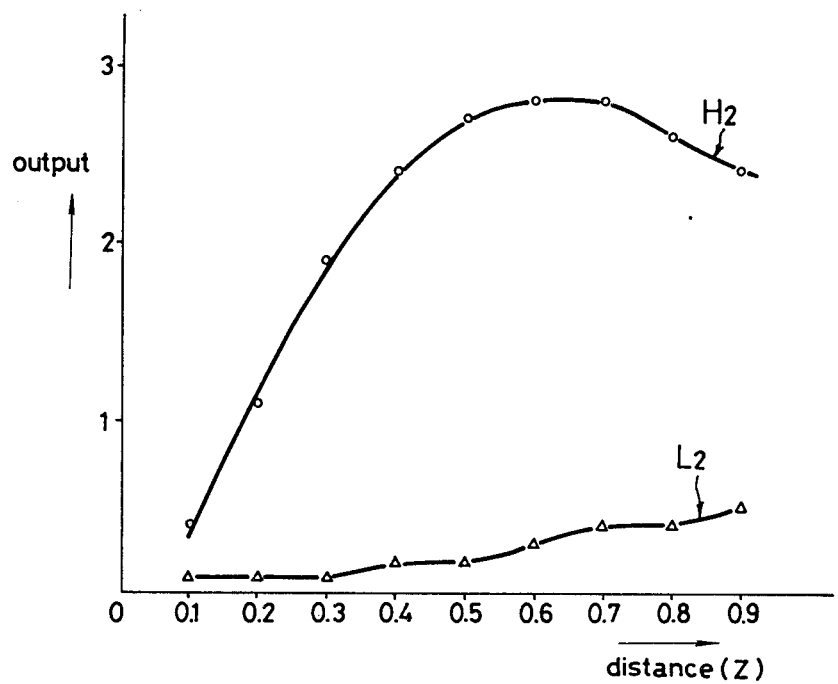
FIG. 8 represents another set of characteristic curves showing high and low level outputs of the present invention.

FIG. 7 is a graphical representation of the high level $H_1$ and low level $L_1$ in an example in which the configuration of the end portions 4 and 5 is selected such that the thickness t=0.5 mm and the length l=0.88 mm, while a rotary encoder disc is utilized for the slit member 3. On the other hand, FIG. 8 shows the variations of the high level and low level in accordance with the distance Z in case where the end portions 4 and 5 are formed into a configuration of t=0.3 mm and l=1.2 mm, while the slit member 3 is made of the rotary encoder disc. Comparing FIGS. 7 and 8 with FIG. 3, it is apparent that the optical fiber sensor of this invention provides a much larger difference between the high level and low level than that obtained in the conventional optical fiber sensor.

According to the optical fiber sensor of this invention, the high level light quantity thereby obtained can be increased remarkably while suppressing rapid increase in the low level light quantity regardless of an increase in distance between the sensor and the slit member, so that the difference between the high level and low level can be maintained at large values. As a consequence the output of the sensor is stabilized, and the sensitivity of the detection can be much improved. Furthermore, the size of the end portions of the optical fibers can be substantially reduced, and no separate device is required for bending or twisting the end portions.

We claim:

1. In an optical fiber sensor comprising an optical fiber coupled with a light emission element and another optical fiber coupled with a light receiving element, end portions of the optical fibers being arranged side by side and joined together in contact along side surfaces thereof, and disposed in opposition to a slit member to be detected so that the arranged direction of the two optical fibers is aligned with a shifting direction of the slit member; the improvement wherein said end portions of the optical fibers are flattened in cross-section joined together within said cross-section.

2. An optical fiber sensor as set forth in claim 1 wherein said slit member is of a type having reflecting surfaces and nonreflecting surfaces alternately so that the surfaces extend in a direction parallel to said shifting direction of said slit member.

3. An optical fiber sensor as set forth in claim 2 wherein said end portions of said optical fibers are spaced apart from said slit member by a predetermined distance so that when one of the reflecting surfaces is brought into an effective region defined relative to said end portions of the optical fibers, light projected from one of the optical fibers is reflected by the reflecting surface to be received by the other optical fiber.

4. An optical fiber sensor as set forth in claim 3 wherein said distance between the end portions of said optical fibers and said slit member is so determined that said effective region is provided with a width measured along the shifting direction of said slit member substantially equal to the width of the nonreflecting surfaces.

* * * * *